United States Patent
Tsugimura

(10) Patent No.: US 9,137,418 B2
(45) Date of Patent: Sep. 15, 2015

(54) IMAGE PROCESSING DEVICE AND COMPUTER-READABLE STORAGE MEDIUM STORING COMPUTER-READABLE INSTRUCTIONS

(71) Applicant: BROTHER KOGYO KABUSHIKI KAISHA, Nagoya-shi, Aichi-ken (JP)

(72) Inventor: Koichi Tsugimura, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/138,841

(22) Filed: Dec. 23, 2013

(65) Prior Publication Data

US 2014/0185103 A1    Jul. 3, 2014

(30) Foreign Application Priority Data

Dec. 27, 2012 (JP) ................. 2012-286234

(51) Int. Cl.
  *H04N 1/04* (2006.01)
  *H04N 1/411* (2006.01)
  *H04N 1/64* (2006.01)

(52) U.S. Cl.
  CPC ............ *H04N 1/4115* (2013.01); *H04N 1/642* (2013.01)

(58) Field of Classification Search
  CPC .................... H04N 1/4115; H04N 1/642
  USPC ............ 358/426, 1.17, 3.27, 1.15, 426.09; 382/164, 166, 243, 232
  See application file for complete search history.

(56) References Cited

U.S. PATENT DOCUMENTS

| 5,479,587 | A | * | 12/1995 | Campbell et al. | 358/1.17 |
| 5,483,622 | A | * | 1/1996 | Zimmerman et al. | 358/1.15 |
| 8,452,110 | B2 | * | 5/2013 | Carmel et al. | 382/232 |
| 2006/0092474 | A1 | * | 5/2006 | Ramsay et al. | 358/3.27 |
| 2011/0255777 | A1 | * | 10/2011 | Matsuoka | 382/164 |

FOREIGN PATENT DOCUMENTS

| JP | 5-225378 A | 9/1993 |
| JP | 2002-288589 A | 10/2002 |
| JP | 2010-28798 A | 2/2010 |
| JP | 2011-228811 A | 11/2011 |
| JP | 2012-74852 A | 4/2012 |

\* cited by examiner

*Primary Examiner* — Houshang Safaipour
(74) *Attorney, Agent, or Firm* — Scully, Scott, Murphy & Presser, P.C.

(57) ABSTRACT

An image processing device may acquire original image data, acquire a level selected from a plurality of levels representing compression degrees, and compress the original image data according to the original image data and the selected level to generate compressed image data. The device compresses first original image data using a first-type compression method, when the original image data is the first original image data and the selected level is a specific level of the plurality of levels. The device compresses second original image data using a second-type compression method different from the first-type compression method, when the original image data is the second original image data and the selected level is the specific level.

27 Claims, 9 Drawing Sheets

Fig. 2   292

TABLE PT1 (SWITCH LEVEL LC = 3)

| COMPRESSION LEVEL | 1 | 2 | 3 | 4 | 5 | 6 | 7 |
|---|---|---|---|---|---|---|---|
| COMPRESSION METHOD | NORMAL | NORMAL | HIGH | HIGH | HIGH | HIGH | HIGH |
| QUANTIZATION TABLE | A1 | A2 | B1 | B2 | B3 | B3 | B4 |
| BACKGROUND RESOLUTION | 300 | 300 | 300 | 250 | 200 | 160 | 100 |
| TEXT RESOLUTION | 300 | 300 | 300 | 300 | 300 | 300 | 300 |

TABLE PT2 (SWITCH LEVEL LC = 4)

| COMPRESSION LEVEL | 1 | 2 | 3 | 4 | 5 | 6 | 7 |
|---|---|---|---|---|---|---|---|
| COMPRESSION METHOD | NORMAL | NORMAL | NORMAL | HIGH | HIGH | HIGH | HIGH |
| QUANTIZATION TABLE | A1 | A2 | A3 | B2 | B3 | B3 | B4 |
| BACKGROUND RESOLUTION | 300 | 300 | 300 | 300 | 250 | 170 | 100 |
| TEXT RESOLUTION | 300 | 300 | 300 | 300 | 300 | 300 | 300 |

TABLE PT3 (SWITCH LEVEL LC = 5)

| COMPRESSION LEVEL | 1 | 2 | 3 | 4 | 5 | 6 | 7 |
|---|---|---|---|---|---|---|---|
| COMPRESSION METHOD | NORMAL | NORMAL | NORMAL | NORMAL | HIGH | HIGH | HIGH |
| QUANTIZATION TABLE | A1 | A2 | A3 | A4 | B3 | B3 | B4 |
| BACKGROUND RESOLUTION | 300 | 300 | 300 | 300 | 300 | 200 | 100 |
| TEXT RESOLUTION | 300 | 300 | 300 | 300 | 300 | 300 | 300 |

TABLE PT4 (SWITCH LEVEL LC = 6)

| COMPRESSION LEVEL | 1 | 2 | 3 | 4 | 5 | 6 | 7 |
|---|---|---|---|---|---|---|---|
| COMPRESSION METHOD | NORMAL | NORMAL | NORMAL | NORMAL | NORMAL | HIGH | HIGH |
| QUANTIZATION TABLE | A1 | A2 | A3 | A4 | A5 | B4 | B4 |
| BACKGROUND RESOLUTION | 300 | 300 | 300 | 300 | 300 | 300 | 100 |
| TEXT RESOLUTION | 300 | 300 | 300 | 300 | 300 | 300 | 300 |

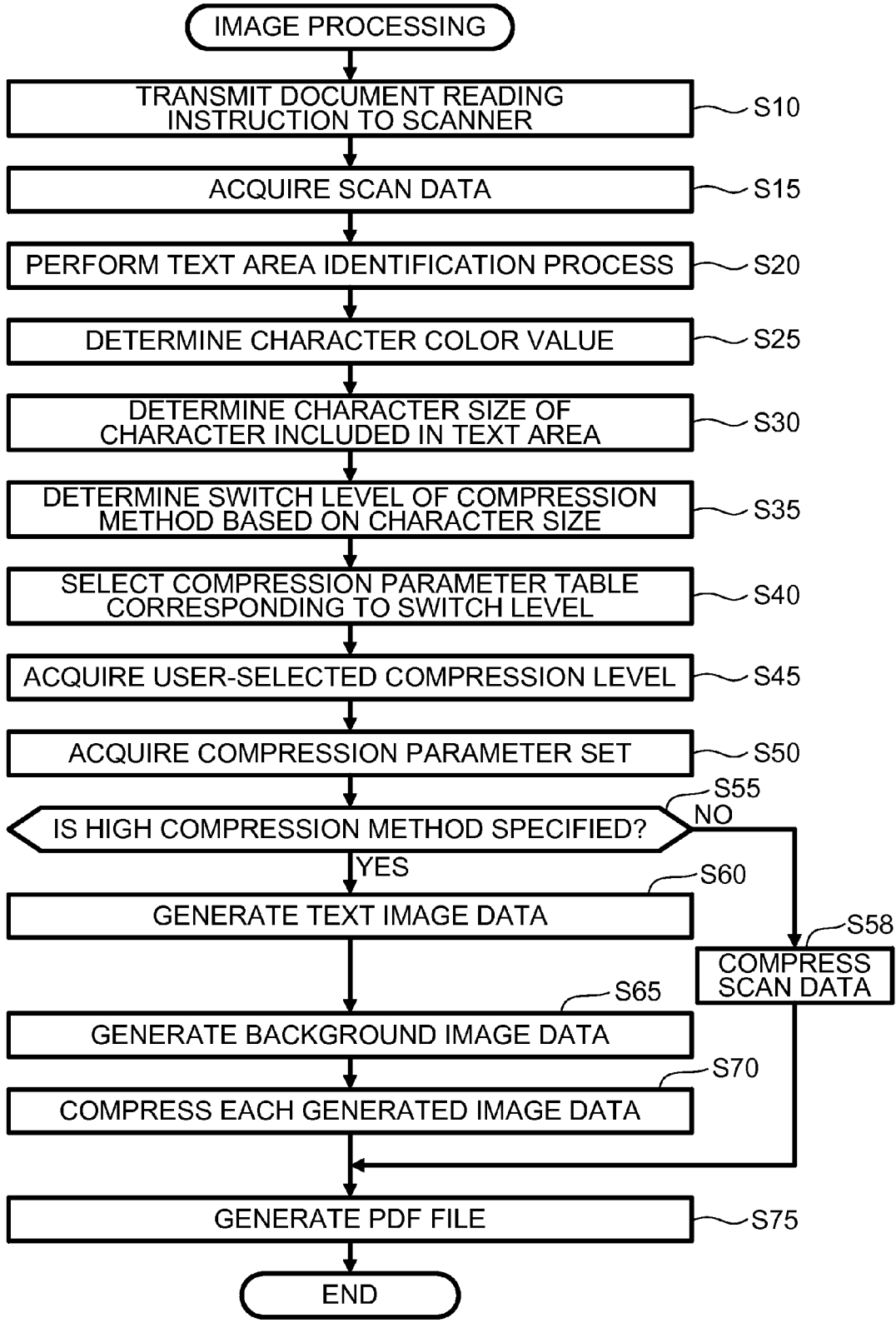

Fig.7

CORRESPONDENCE TABLE BETWEEN
CHARACTER SIZE TS AND SWITCH LEVEL LC

| CHARACTER SIZE TS (POINTS) | SWITCH LEVEL LC |
|---|---|
| TS ≤ 8 | 3 |
| 8 < TS ≤ 16 | 4 |
| 16 < TS ≤ 24 | 5 |
| 24 < TS | 6 |

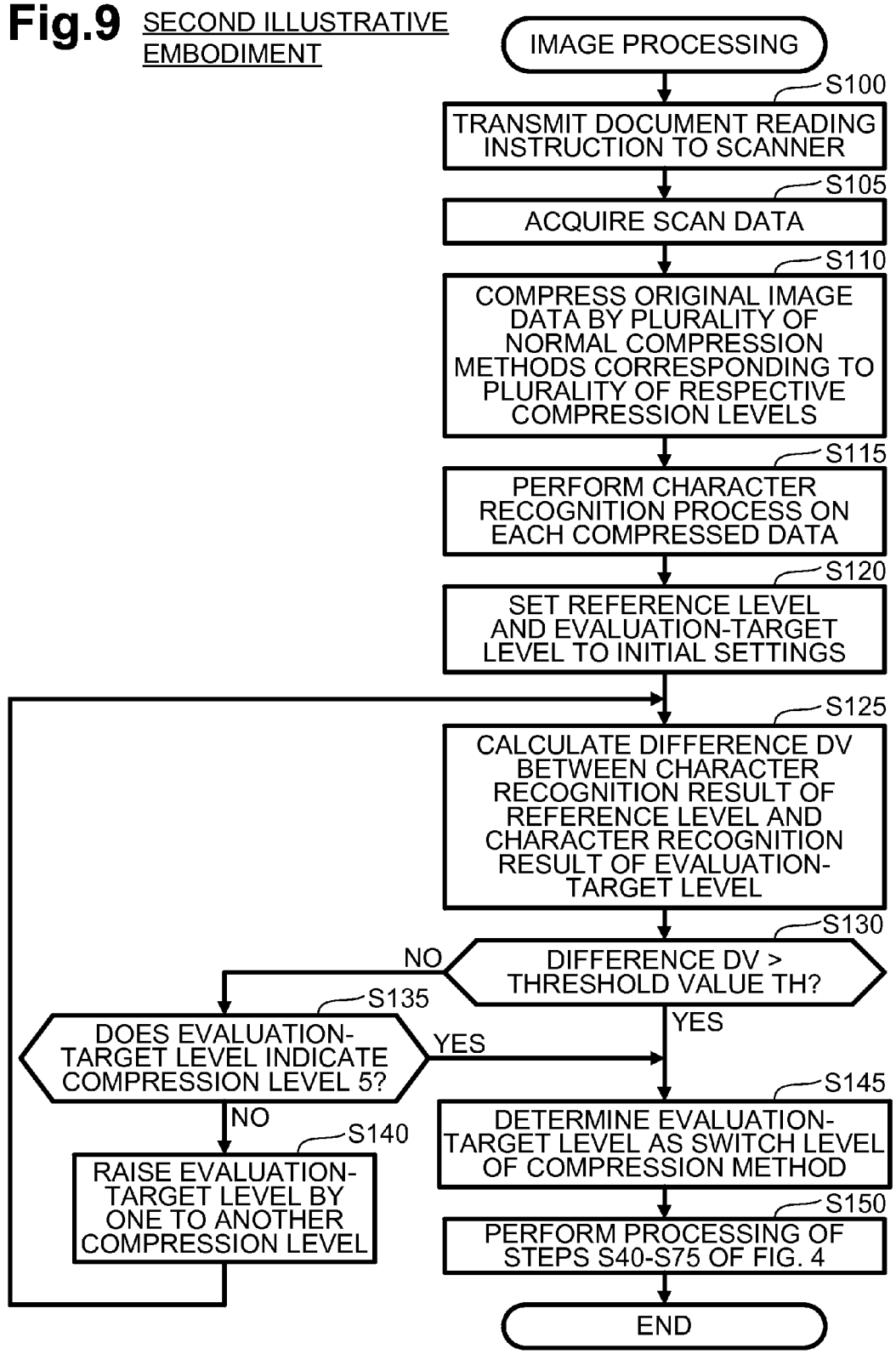

IMAGE PROCESSING DEVICE AND COMPUTER-READABLE STORAGE MEDIUM STORING COMPUTER-READABLE INSTRUCTIONS

CROSS-REFERENCE TO RELATED APPLICATION

This application claims priority from Japanese Patent Application No. 2012-286234, filed on Dec. 27, 2012, which is incorporated herein by reference.

TECHNICAL FIELD

Aspects described herein relate to image processing, and more particularly, to a technique of compressing image data including text.

BACKGROUND

In a known compression technique, image data representing an image including text is compressed in accordance with a compression degree (e.g., one of high compression, medium compression, and low compression) specified by a user. In the known technique, when the high compression is specified and black characters of the text included in the image are regarded as important, the image data is segmented into a foreground layer representing the text and a background layer representing a background other than the text. The foreground layer is compressed using a lossless compression method and the background layer is compressed using a lossy compression method. When one of the medium compression and the low compression is specified or when the black characters of the text are not regarded as important, the image data is compressed using the lossy compression method without being segmented into the foreground layer and the background layer.

SUMMARY

Nevertheless, in the known technique, due consideration might not be given to characteristics of the characters included in the image, and thus, some image data may lose its image quality impermissibly after compression.

For example, some embodiments of the disclosure provide for a technique of appropriately compressing image data representing an image including text to ensure adequate image quality for the compressed image data.

According to one or more aspects of the disclosure, an image processing device includes a processor configured to: acquire original image data representing an original image; acquire a level selected from a plurality of levels that represent compression degrees; and compress the original image data according to the original image data and the selected level so as to generate compressed image data. To compress the original image data, the processor configured to: compress first original image data using a first-type compression method when the original image data is the first original image data and when the selected level is a specific level of the plurality of levels; and compress second original image data using a second-type compression method that is different from the first-type compression method when the original image data is the second original image data and when the selected level is the specific level.

According to one or more aspects of the disclosure, a computer-readable storage medium storing computer-readable instructions that, when executed, causes a processor to perform a method including: acquiring original image data representing an original image; acquiring a level selected from a plurality of levels that represent compression degrees; and compressing the original image data according to the original image data and the selected level so as to generate compressed image data. The compressing of the original image data further includes: compressing first original image data using a first-type compression method when the original image data is the first original image data and when the selected level is a specific level of the plurality of levels; and compressing second original image data using a second-type compression method that is different from the first-type compression method when the original image data is the second original image data and when the selected level is the specific level.

According to one or more aspects of the disclosure, a method includes: acquiring original image data representing an original image and acquiring a level selected from a plurality of levels that represent compression degrees. The method further includes compressing first original image data using a first-type compression method if the original image data is the first original image data and the selected level is a specific level of the plurality of levels; and compressing a second original image data using a second-type compression method that is different from the first-type compression method if the original image data is the second original image data different from the first original image data and the selected level is the specific level.

Other objects, features, and advantages will be apparent to persons of ordinary skill in the art from the following detailed description of the disclosure and the accompanying drawings.

DESCRIPTION OF THE DRAWINGS

For a more complete understanding of the present disclosure, needs satisfied thereby, and the objects, features, and advantages thereof, reference now is made to the following descriptions taken in connection with the accompanying drawings.

FIG. 2 depicts an example compression parameter table set in the first illustrative embodiment according to one or more aspects of the disclosure.

FIG. 4 is a flowchart depicting image processing in the first illustrative embodiment according to one or more aspects of the disclosure.

FIG. 7 depicts a correspondence table of a character size TS and a switch level LC in the first illustrative embodiment according to one or more aspects of the disclosure.

FIG. 9 is a flowchart depicting image processing in a second illustrative embodiment according to one or more aspects of the disclosure.

DETAILED DESCRIPTION

Figure 1:
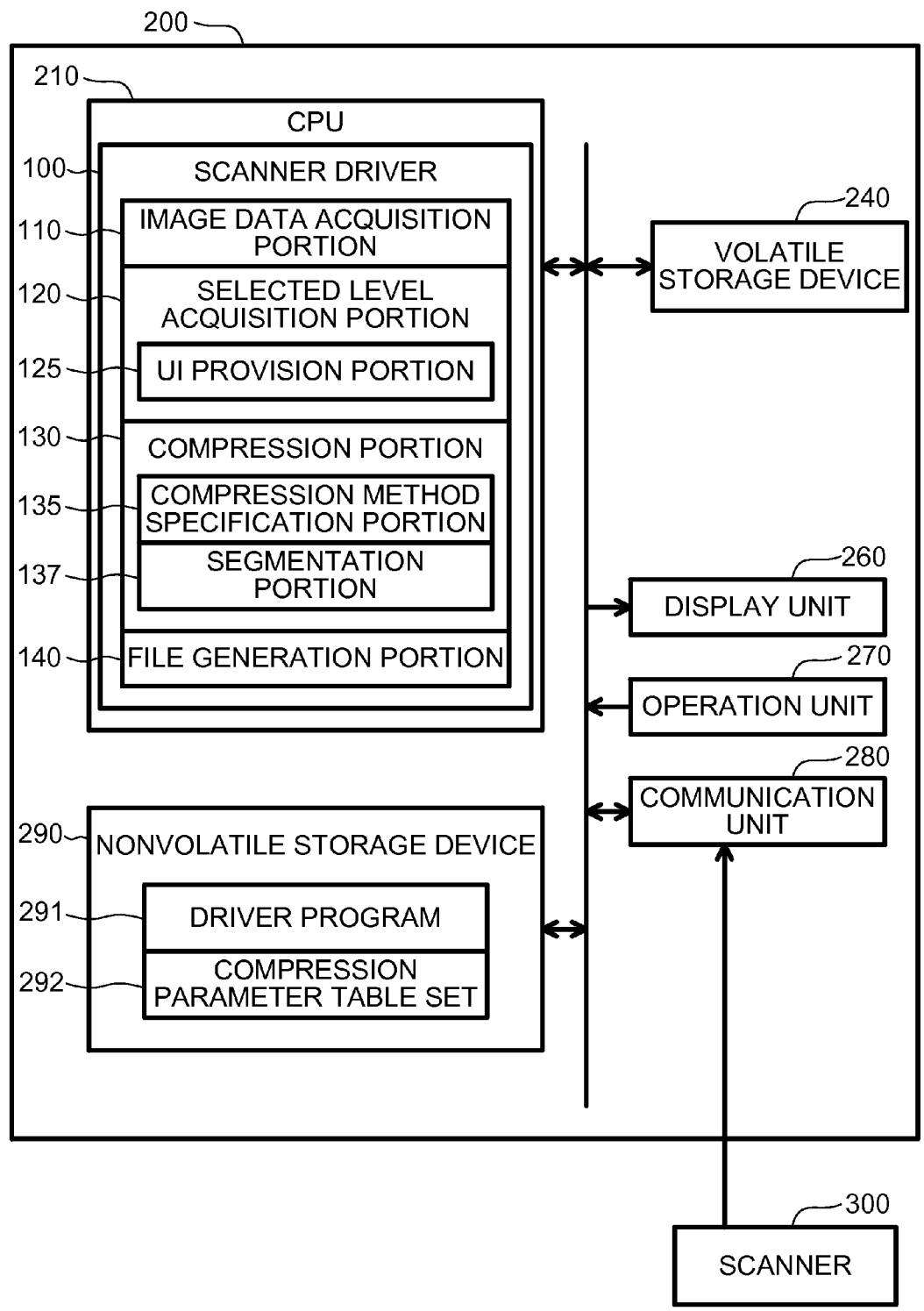
FIG. 1 is a block diagram depicting a configuration of a computer as an image processing device in a first illustrative embodiment according to one or more aspects of the disclosure.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

In general, the present disclosure relates to image processing, for example to compressing image data including text. In some of the various embodiments discussed herein, text and image data are compressed using different compression methods based on both characteristics of the original image data and a selected compression degree. In some cases, where the original image data includes text, the image compression method that is used can be based on a detected size of a character included in that original image data. Accordingly, in example cases where a user can set a compression degree, characteristics of original image data can be used to determine a particular method by which that original image data is compressed, thereby maintaining a desired compression of the original image data (e.g., including combined or separate compression of text and background) while ensuring adequate image quality of the resulting compressed image.

A. First Illustrative Embodiment

A-1. Configuration of Image Processing Device

Aspects of the disclosure are described with reference to illustrative embodiments. FIG. 1 is a block diagram depicting a configuration of a computer 200 as an image processing device in a first illustrative embodiment.

The computer 200 is, for example, a personal computer, and includes a central processing unit ("CPU") 210, a volatile storage device 240 such as a random-access memory ("RAM"), a display unit 260 such as a liquid crystal display, an operation unit 270 such as a mouse and a keyboard, a communication unit 280 for communicating with an external device, and a nonvolatile storage device 290 such as a hard disk drive and a read-only memory ("ROM"). In alternative embodiments, other computer-readable storage media, incorporated into computer storage devices, could be included in the computer 200 as well.

The computer 200 is connected to the external device, for example, a scanner 300, communicably, via the communication unit 280. The scanner 300 may be an image reading device that may optically read a document to acquire scan data.

In the embodiment shown, a buffer area for temporarily storing various intermediate data generated during execution of processing by the CPU 210 is allocated in the volatile storage device 240. The nonvolatile storage device 290 stores a driver program 291 and a compression parameter table set 292 therein. The driver program 291 is supplied with a CD-ROM, for example.

The CPU 210 functions as the scanner driver 100 that may perform image processing (see FIG. 2) for compressing original image data to generate a PDF file including compressed image data, by execution of the driver program 291. In the embodiment shown, the scanner driver 100 includes an image data acquisition portion 110, a selected level acquisition portion 120, a compression portion 130, and a file generation portion 140. The image data acquisition portion 110 is configured to acquire scan data, which may be treated as original image data representing an original image, using the scanner 300. The selected level acquisition portion 120 is configured to acquire a compression level selected by a user from a plurality of compression levels that may represent compression degrees, respectively. The selected level acquisition portion 120 includes a user interface ("UI") provision portion 125 configured to display (or provide) a user interface image ("UI image") for receiving the user's selection of the compression level, on the display unit 260. The compression portion 130 is configured to compress the original image data according to the original image data and the selected level so as to generate compressed image data. The compression portion 130 includes a compression method specification portion 135 and a segmentation portion 137. In some embodiments, the compression method specification portion 135 is configured to specify a plurality of compression methods corresponding to the plurality of compression levels, respectively, one of which can be selected by the user. The segmentation portion 137 is configured to segment the original image data into text image data representing a text image and background image data representing a background image. The file generation portion 140 is configured to generate a PDF file that may store the compressed image data.

Although in the embodiment shown the computer 200 and scanner 300 are separate and communicatively connected to one another, in example alternative embodiments the computer 200 and scanner 300 are integrated such that the same device that acquires scan data can perform one or more of the image processing operations described herein. In still further embodiments, the computer 200 and scanner 300 can be remote from one another, or the computer could include a plurality of networked (e.g., local and remote) computers, such that image processing can be performed remotely from the location at which scan data is captured.

Although particular features are discussed herein as included within a computer 200, it is recognized that in certain embodiments not all such components or features may be included within a computer executing according to the methods and systems of the present disclosure. Furthermore, different types of hardware and/or software systems could be incorporated into such an electronic computing device.

In accordance with the present disclosure, the term computer readable media may include computer-readable storage media and communication media. As used in this document, a computer storage medium is a device or article of manufacture that stores data and/or computer-executable instructions.

Computer-readable storage media may include volatile and nonvolatile, removable and non-removable devices or articles of manufacture implemented in any method or technology for storage of information, such as computer readable instructions, data structures, program modules, or other data. By way of example, and not limitation, computer-readable storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Computer-readable storage media generally includes at least some tangible component on which computer-executable instructions can be stored, and can be included in a computer storage device such as any of the devices discussed above. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

A-2. Compression Levels and Compression Methods

FIG. 2 depicts an example of the compression parameter table set 292. In the example shown, the compression parameter table set 292 includes four compression parameter tables PT1, PT2, PT3, and PT4 that may be used when the compression portion 130 compresses original image data. One of the four compression parameter tables PT1, PT2, PT3, and PT4 may be selected in accordance with the original image data and then used for compression of the original image data.

In the embodiment shown, each of the compression parameter tables PT1, PT2, PT3, and PT4 includes a plurality of, for example seven, compression levels (e.g., compression levels 1 to 7) that represent compression ratios (also referred to as "compression degrees"), respectively. Further, a compression parameter set defining a compression method is stored in association with each of the compression levels 1 to 7, respectively. The higher the compression level becomes, the higher the compression ratio becomes. In some embodiments, there may be a negative correlation between the compression ratio and the data size of compressed data. That is, as the compression level representing the compression ratio becomes higher, the data size of compressed data to be obtained becomes smaller.

In this illustrative embodiment, broadly, two different types of compression methods, that is, a normal compression method (also, referred to as "first-type compression method") and a high compression method (also, referred to as "second-type compression method") may be adopted. As depicted in FIG. 2, each compression parameter set may comprise information specifying one of the normal compression method and the high compression method.

In the high compression method, the segmentation portion 137 may segment original image data into text image data and background image data. Then, the compression portion 130 may compress the text image data using a lossless compression process, for example, a compression process using the Modified Modified Read ("MMR") method (also referred to as "FAXG4 method") in this illustrative embodiment. Further, the compression portion 130 may compress the background image data using a lossy compression process, for example, a Joint Photographic Experts Group ("JPEG") compression process in this illustrative embodiment.

In the normal compression method, the compression portion 130 compresses original image data or image data obtained by which resolution (the number of pixels) of the original image data may be reduced, using the lossy compression process, for example, the JPEG compression process in this illustrative embodiment. That is, in the normal compression method, the processing in which the segmentation portion 137 segments original image data into text image data and background image data might not be performed.

In some embodiments, in each of the four compression parameter tables PT1, PT2, PT3, and PT4, one of the seven compression levels is defined as a switch level LC. More specifically, in the example shown in FIG. 2, compression levels 3, 4, 5, and 6 are defined as the switch levels LC in the four compression parameter tables PT1, PT2, PT3, and PT4, respectively. In each of the four compression parameter tables PT1, PT2, PT3, and PT4, the high compression method may be associated with each of the compression levels from the switch level LC to the compression level 7 representing the highest compression ratio, and the normal compression method may be associated with each of the compression levels from the compression level 1 representing the lowest compression ratio to the compression level (LC-1) that is one level lower than the switch level LC. For example, in the compression parameter table PT2, the compression level 4 may be defined as the switch level LC. Therefore, in the compression parameter table PT2, the normal compression method may be associated with each of the three compression levels 1, 2, and 3 and the high compression method may be associated with each of the other four compression levels 4, 5, 6, and 7 (see FIG. 2).

For example, the normal compression process corresponding to the compression level 1 in each of the four compression parameter tables PT1, PT2, PT3, and PT4 is executed by the exact same compression method. In addition, the normal compression process corresponding to the compression level 4 in each of the two compression parameter tables PT3 and PT4 is executed by the exact same compression method. That is, the normal compression process corresponding to the same compression level in each of the different compression parameter tables is executed by the same compression method, regardless of the varieties of the compression parameter tables. Further, in such embodiments, the high compression process corresponding to the compression level 7 in each of the four compression parameter tables PT1, PT2, PT3, and PT4 is executed by the same compression method. However, the high compression process corresponding to a specific compression level (e.g., the compression level 6) other than the compression level 7 in each of the four compression parameter tables PT1, PT2, PT3, and PT4 is executed by different compression method. One or more compression parameters corresponding to the specific compression level, e.g., a background resolution, may differ among the compression parameter tables PT1, PT2, PT3, and PT4.

The different compression levels are defined as the switch levels LC in the four compression parameter tables PT1, PT2, PT3, and PT4. Therefore, there may be a case where different compression parameter tables are used in different cases although the same compression level is selected by the user (the compression level selected by the user may be also referred to as "selected level") in all the different cases. In such a case, there is a possibility that different compression methods are used in the respective cases. For example, when the selected level is compression level 4 and one of the compression parameter tables PT1 and PT2 is used, the high compression method may be adopted (see FIG. 2). However, when the selected level is compression level 4 and one of the compression parameter tables PT3 and PT4 is used, the normal compression method may be adopted (see FIG. 2). When the same compression parameter table is used in different cases but different compression levels are selected in the respective cases, there may be a possibility that different compression methods may be adopted in the respective different cases. For example, in a case where the compression parameter table PT2 is used in different cases, the high compression method may be adopted in one case when the selected level is compression level 4, and the normal compression method may be adopted in another case when the selected level is compression level 3 (see FIG. 2).

In example embodiments, each of the compression parameter sets further includes information specifying a type of a quantization table to be used in the JPEG compression. As depicted in FIG. 2, in the normal compression method, one of five different types of quantization tables A1, A2, A3, A4, and A5 may be adopted. In the high compression method, one of four different types of quantization tables B1, B2, B3, and B4 may be adopted.

Figures 3A, 3B:
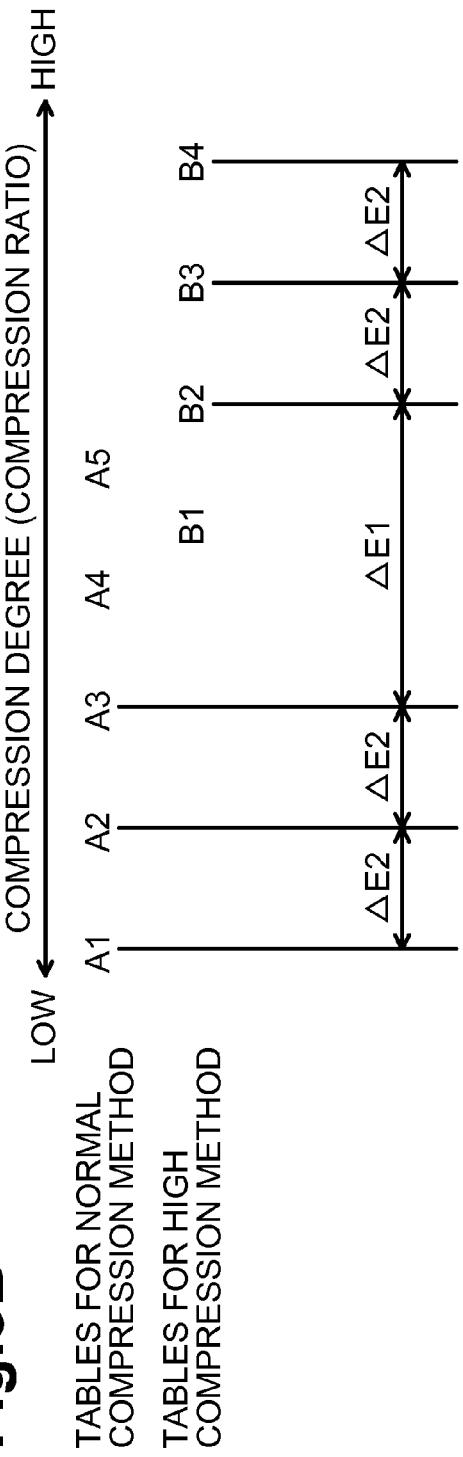
FIGS. 3A and 3B are diagrams for explaining a quantization table in the first illustrative embodiment according to one or more aspects of the disclosure.

FIGS. 3A and 3B are diagrams for explaining a quantization table. FIG. 3A illustrates an example of a quantization table QT. In the example shown, the quantization table QT includes a total of 64 quantization coefficients, with eight types in a vertical direction and eight types in a horizontal direction. The total of 64 quantization coefficients may correspond to discrete cosine transform ("DCT") coefficients representing frequency components of eight types in the vertical direction and eight types in the horizontal direction. The greater the values of quantization coefficients are, a higher compression ratio may be obtained as a result of the JPEG compression process.

FIG. 3B shows example compression ratios to be obtained as a result of compression using the nine different types of the quantization tables A1-A5 and B1-B4. In the five different types of quantization tables A1-A5 for normal compression method, a quantization table assigned a reference symbol having a greater number includes greater values of the 64 quantization coefficients, and thus, a higher compression ratio may be obtained. Likewise, in the four different types of quantization tables B1-B4 for the high compression method, a quantization table assigned a reference symbol having a greater number includes greater values of the 64 quantization coefficients, and thus, a higher compression ratio may be obtained. The compression ratio obtained using the quantization table B1 for high compression method is set to substantially a midlevel between the two compression ratios obtained using the quantization tables A4 and A5 for normal compression method, wherein the quantization table B1 provides the lowest compression ratio among the four quantization tables B1-B4 for high compression method. The compression ratio obtained using the quantization table B2 for high compression method is set to be higher than the compression ratio obtained using the quantization table A5 for normal compression method, wherein the quantization table A5 provides the highest compression ratio among the five quantization tables A1-A5 for normal compression method. Therefore, in the example shown the order in which the compression ratios become higher among the nine quantization tables are A1, A2, A3, A4, B1, A5, B2, B3, and B4 (see FIG. 3B).

In example embodiments, each of the compression parameter sets further includes information specifying the background resolution and information specifying a text resolution (see FIG. 2). In the normal compression method, the original image data might not be segmented into text image data and background image data. Therefore, for the normal compression method, the background resolution and the text resolution may have the same value. For the high compression method, the background resolution may define the resolution of background image data and the text resolution may define the resolution of text image data. Therefore, for the high compression method, there may be a case where the background resolution and the text resolution may have different values. As the resolution becomes lower, the compression ratio may become higher.

The example background resolution and the text resolution depicted in FIG. 2 represent examples in a case where the resolution specified by the user is 300 dpi (dot per inch). However, in various alternative embodiments, the example resolution may vary. In some cases at least the text resolution may be set to the resolution specified by the user. That is, the text resolution may have a constant value regardless of the compression parameter tables and the compression levels.

In some embodiments, in the normal compression method, the text resolution and the background resolution have the same value. Therefore, in such example embodiments the background resolution also has a constant value regardless of the compression parameter tables and the compression levels. The higher the compression level, the quantization table to be used in the normal compression method may provide a higher compression ratio. Thus, a higher compression level may achieve a higher compression ratio as a result of the compression process.

For example, a comparison is made between the normal compression method corresponding to the compression level 2 (also, referred to as "first specific level") in the compression parameter table PT3 and the normal compression method corresponding to the compression level 3 (also, referred to as "second specific level") in the compression parameter table PT3. In the normal compression method corresponding to the first specific level, the JPEG compression process using a first quantization table (e.g., the quantization table A2) may be performed on image data with a specific resolution (e.g., 300 dpi) obtained from original image data. In the normal compression method corresponding to the second specific level, the JPEG compression process using a second quantization table (e.g., the quantization table A3) that may provide a higher compression ratio than the compression ratio provided by the first quantization table, on image data with the specific resolution (e.g., 300 dpi) obtained from original image data. As a result, quantization tables that may be used in the JPEG compression process in the normal compression method may vary depending on the selected level. Therefore, the compression ratio to be obtained as a result of the normal compression method may be changed readily in accordance with the selected level.

The higher the compression level, the background resolution may become lower and/or the quantization table to be used in the high compression method may provide a higher compression ratio. Thus, a higher compression level achieves a higher compression ratio as a result of a compression process.

For example, a comparison is made between a high compression method corresponding to the compression level 6 (also, referred to as "third specific level") in the compression parameter table PT3 and a high compression method corresponding to the compression level 7 (also, referred to as "fourth specific level") in the compression parameter table PT3. Each of the two high compression methods corresponding to the third specific level and the fourth specific level, respectively, includes processing for compressing text image data with a specific resolution (e.g., 300 dpi). The high compression method corresponding to the third specific level may include processing for compressing background image data with a first resolution (e.g., 200 dpi), and the high compression method corresponding to the fourth specific level may include processing for compressing background image data with a second resolution (e.g., 100 dpi) that may be lower than the first resolution. That is, in the high compression methods, the resolutions of the text image data might not vary depending on the selected level but the resolutions of the background image data may vary depending on the selected level. Thus, while the image quality of the character is maintained, the compression ratio to be obtained as a result of the high compression method may be changed readily in accordance with the selected level. The high compression method corresponding to the third specific level may include the JPEG compression process in which a third quantization table (e.g., the quantization table B3) may be used for the background image data, and the high compression method corresponding to the fourth specific level may include the JPEG compression process in which a fourth quantization table (e.g., the quantization table B4) may be used for the background image data, wherein the compression ratio provided by the fourth quantization table may be higher than the compression ratio provided by the third quantization table. Thus, in the high compression methods, the resolutions of the text image data might not vary depending on the selected level but the quantization tables to be used in the JPEG compression process that may be performed on the background image data may vary depending on the selected level. Thus, while the image quality of the character is maintained, the compression ratio to be obtained as a result of the high compression method may be changed readily in accordance with the selected level.

In each compression parameter table, a difference ΔE1 in compression ratio between a quantization table associated with a compression level (LC-1) that may be one level lower than the switch level LC and a quantization table associated with the switch level LC (also, referred to as "first difference ΔE1") may be greater than a difference ΔE2 in compression ratio between two quantization tables associated with other adjacent two compression levels (also, referred to as "second difference ΔE2"). FIG. 3B illustrates the first difference ΔE1 and the second differences ΔE2 in the compression parameter table PT2. As described above, in the high compression method, two pieces of compressed data (e.g., the compressed text image data and the compressed background image data) may be generated. Therefore, a total data size of the compressed data generated by the high compression method may tend to become larger than a total data size of the compressed data generated by the normal compression method in which one piece of compressed data may be generated. Thus, the first difference ΔE1 may be set to be greater than the second differences ΔE2, resulting in ensuring that the total data size of the two pieces of compressed data obtained by compression of specific original image data at the compression level LC (e.g., the switch level LC) may become smaller than the total data size of the one piece of compressed data obtained by compression of the specific original image data at the compression level (LC-1). One of reasons for preparing the quantization tables A1-A5 for normal compression method and the quantization tables B1-B4 for high compression method independently may be to determine the first difference ΔE1 and the second difference ΔE2 appropriately.

In each of the compression parameter tables PT1-PT4, the compression parameters may be set appropriately such that, as the compression level becomes higher, the compression ratio to be obtained as a result of the compression process may also become higher, ideally, the compression ratio to be obtained as a result of the compression process may increase linearly.

Further, the compression parameters may be set such that substantially the same degree of compression ratios may be obtained as a result of the respective four compression methods corresponding to the same compression levels in the four compression parameter tables PT1, PT2, PT3, and PT4. For example, the compression parameters may be set experimentally such that substantially the same degree of compression ratios may be obtained as a result of the respective four compression methods corresponding to the same compression levels when the same original image data representing an expected typical original image (e.g., a typical business document including one or more of graphs, photographs, and texts) is used in the four compression methods.

A-2. Image Processing

FIG. 4 is a flowchart of image processing according to the first illustrative embodiment. Image processing may be performed by the scanner driver 100 when, for example, the user provides an instruction to read a document (e.g., an instruction to generate scan data) to the scanner driver 100 after setting the document in the scanner 300. For example, the instruction to read the document may include specifications of reading conditions, such as a resolution specification and a color specification of one of color and monochrome.

In step S10, the image data acquisition portion 110 transmits, to the scanner 300, a document reading instruction including the specified reading conditions. In step S15, the image data acquisition portion 110 acquires scan data in accordance with the specified reading conditions, as processing-target original image data. More specifically, the image data acquisition portion 110 may cause the scanner 300 to read the document in an optical resolution that may be equal to the resolution specified in the reading instruction, to acquire the scan data with the specified resolution from the scanner 300. In other embodiments, for example, the image data acquisition portion 110 may cause the scanner 300 to read the document in an optical resolution that may be different from the specified resolution, to acquire the scan data with the resolution that may be different from the specified resolution from the scanner 300. In this case, the image data acquisition portion 110 may perform a resolution conversion process on the scan data acquired from the scanner 300 so as to acquire the scan data with the specified resolution. Hereinafter, a description is made by taking a case where color scan data with a resolution of 300 dpi (dot per inch) is acquired as the scan data in accordance with the specified reading conditions, as an example. The scan data acquired in step S10 may also be referred to as "original image data" and the image represented by the scan data may also be referred to as "original image".

In example embodiments, the original image data may be RGB image data. Each of pixel data constituting the original image data may include three color component values (e.g., an R value, a G value, and a B value) of red ("R"), green ("G"), and blue ("B"). In this illustrative embodiment, each color component value may include 256 tones. In some alternative examples, original image data could be represented in a YUV format, YCbCr format, or other image formats.

Figure 5A:
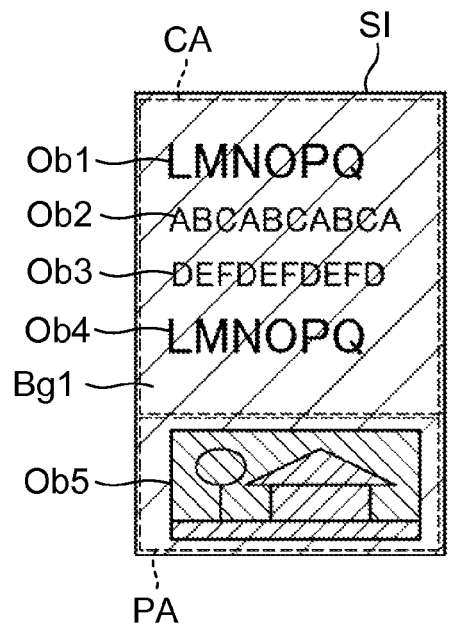
FIG. 5A illustrates an example original image SI represented by original image data in the first illustrative embodiment according to one or more aspects of the disclosure.
Figure 5B:
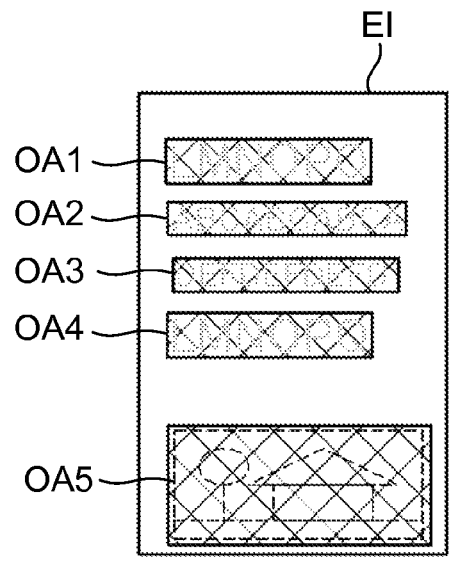
FIG. 5B illustrates an example edge image EI represented by edge image data in the first illustrative embodiment according to one or more aspects of the disclosure.

FIG. 5A illustrates an example of an original image SI represented by original image data and FIG. 5B illustrates an example of an edge image EI represented by edge image data. In the example shown, the original image SI includes a ground Bg1 and five objects Ob1, Ob2, Ob3, Ob4, and Ob5, that is, character objects Ob1, Ob2, Ob3, and Ob4 and a photograph object Ob5.

In step S20 (see FIG. 4), the scanner driver 100 performs a text area identification process in which a text area included in the original image SI may be identified. More specifically, the scanner driver 100 may apply an edge detection filter, for example, the Sobel filter, to the original image data so as to generate edge image data representing an edge image EI (see FIG. 5B). The scanner driver 100 may identify, in the edge image EI, an area whose edge intensity is greater than a reference value, so as to determine an area of the original image SI corresponding to the identified area in the edge image EI, as an object area. In the example depicted in FIG. 5B, five object areas OA1-OA5 corresponding to the five objects Ob1-Ob5 of the original image SI, respectively, may be identified in the edge image EI.

The scanner driver 100 may determine whether the identified object area is a character object area on each of the object areas OA1-OA5, based on a color distribution of each of the object areas OA1-OA5 of the original image SI. More specifically, the scanner driver 100 may calculate varieties C of intensity values included in an evaluation-target object area, using an intensity histogram for the object area. The scanner driver 100 may classify a plurality of pixels included in the object area into a background pixel having a color similar to a color of an area surrounding the object area (e.g., a background color) and an object pixel other than the background pixel, and calculate a ratio D of the number of the object pixels to the number of the background pixels. There is be a tendency that the varieties C of the intensity values and the ratio D of the object pixels to the background pixels in a character object are less than those of the other-type objects. Thus, the scanner driver 100 determines the evaluation-target object area as character object area when the varieties C of the intensity values in the evaluation-target object area are less than a first threshold value and the ratio D of the object pixels to the background pixels in the evaluation-target object area is less than a second threshold value. In the example depicted in FIG. 5A, the object areas OA1-OA4 corresponding to the character objects Ob1-Ob4, respectively, may be determined as character object areas, respectively, and the object area OA5 corresponding to the photograph object Ob5 might not be determined as character object area.

As depicted in FIG. 5A, the scanner driver 100 may determine, as a text area CA, an area that may include all the character object areas (e.g., the four object areas corresponding to the character objects Ob1, Ob2, Ob3, and Ob4) but not include any object area other than the character object areas (e.g., the object area corresponding to the photograph object Ob5).

Other known methods may be adopted to the method of identifying the text area. The known methods are disclosed in, for example, Japanese Laid-Open Patent Publication Nos. Hei 5-225378 and 2002-288589, the disclosures of which are each hereby incorporated by reference in their entireties.

In steps S25 and S30 of FIG. 4, the compression method specification portion 135 analyzes partial original image data, corresponding to the text area CA, of the original image data so as to determine a character size of the characters included in the text area CA.

Figure 6A:
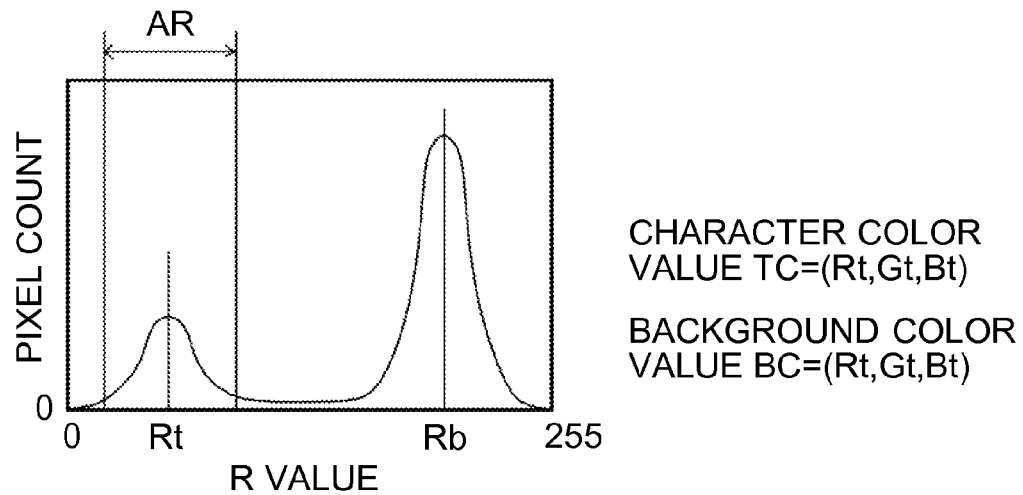
FIGS. 6A and 6B are diagrams for explaining determination of a character size in the first illustrative embodiment according to one or more aspects of the disclosure.
Figure 6B:
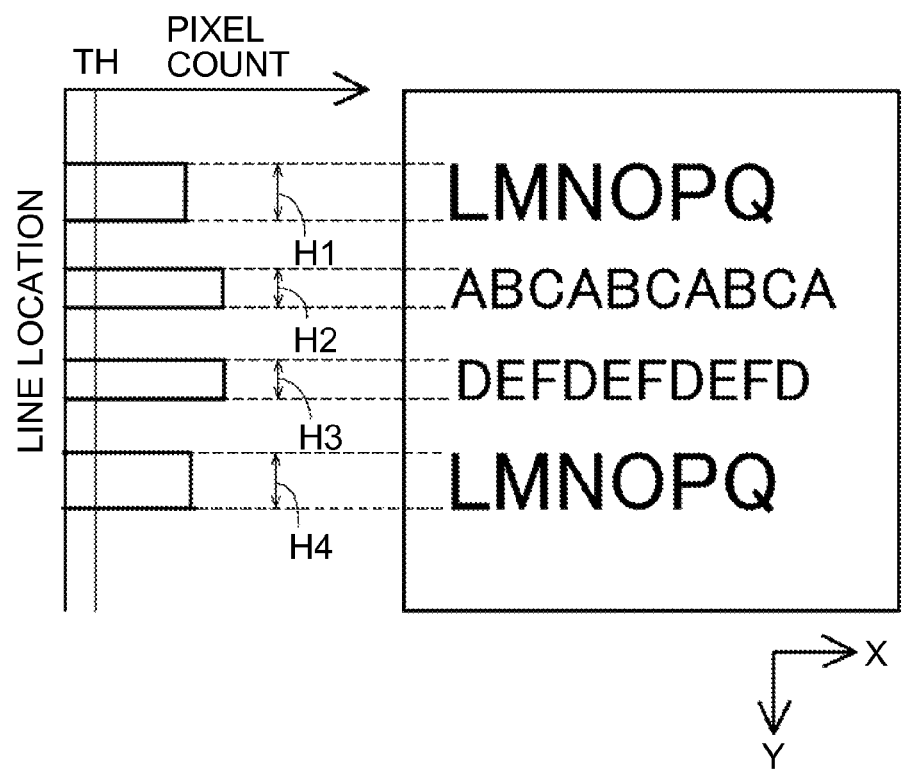

FIGS. 6A and 6B are example diagrams for explaining a possible character size determination useable in connection with the present disclosure. First, in step S25 of FIG. 4, the compression method specification portion 135 determines a character color value TC (Rt, Gt, Bt) representing the color of the characters included in the text area CA. More specifically, the compression method specification portion 135 may generate histogram data representing a histogram of the partial original image data for each color component. The histogram data may be obtained by which each pixel of the partial original image data may be classified into one of a plurality of classes in accordance with a component value of each pixel. In this illustrative embodiment, the histogram data may be generated while each of 256 tone values is regarded as one class. FIG. 6A depicts an example R-component histogram for the partial original image data. As depicted in FIG. 6A, the R-component histogram may include a first mountain-shaped portion corresponding to the characters included in the text area CA and a second mountain-shaped portion corresponding to a background included in the text area CA. The compression method specification portion 135 may identify a peak tone value (e.g., a value that may occur most frequently in the first mountain-shaped portion) corresponding to a peak in the first mountain-shaped portion as an R-component value Rt representing the character color value. Generally, a total area of the characters may be smaller than an area of the background. Therefore, for example, the compression method specification portion 135 may identify the peak tone value whose frequency count may be less than the other peak tone value, that is, the peak tone value of the mountain-shaped portion having the lower peak, from the two peak tone values corresponding to the respective peaks in the two mountain-shaped portions, as the R-component value Rt representing the character color value. In the same manner, the compression method specification portion 135 may also identify a G-component value Gt and a B-component value Bt each representing the character color value TC by using G-component histogram data and B-component histogram data, respectively.

In step S30 of the example depicted in FIG. 4, the compression method specification portion 135 determines a character size TS of the characters included in the text area CA by using the character color value TC obtained in step S25. As depicted in FIG. 6B, the compression method specification portion 135 may count the number of pixels having the color represented by the character color value TC and the number of pixels having the color similar to the color represented by the character color value TC (e.g., character-constituting pixels) by location in a Y-axis direction in the text area CA, in other words, on a pixel line basis in the text area CA. More specifically, the compression method specification portion 135 may determine a predetermined range AR (see FIG. 6A) centered at the R-component value Rt representing the character color value TC. Similar to this, the compression method specification portion 135 may determine a predetermined range AG (not depicted) centered at the G-component value Gt representing the character color value TC and a predetermined range AB (not depicted) centered at the B-component value Bt representing the character color value TC. Then, the compression method specification portion 135 may count the number of pixels, wherein each of the pixels has R-, G-, and B-component values having colors within the corresponding predetermined ranges, on the pixel line basis in the text area CA.

In example embodiments, the compression method specification portion 135 identifies a character-constituting pixel line that may be a line consisting of character-constituting pixels whose count may be a threshold value TH or greater, and then identify a minimum consecutive occurrence count Hmin of the character-constituting pixel line. The minimum consecutive occurrence count Hmin of the character-constituting pixel line may be a minimum value of values H1, H2, H3, and H4, each of which may represent a consecutive occurrence count of the character-constituting pixel line in the Y-axis direction in the text area CA (see FIG. 6B). The compression method specification portion 135 may calculate the character size TS (the unit may be point (1 inch=72 points)) using the minimum consecutive occurrence count Hmin and the resolution RS (the unit may be dpi (dot per inch)) of the original image data.

$$TS = (H\min/RS) \times 72 \tag{1}$$

As understood from FIG. 6B, the character size TS may represent the minimum value of heights of the characters in the text area CA, wherein each of the heights may consist of the plurality of character-constituting pixel lines. The reason for using the minimum value as character size TS may be that the determined character size TS may be used to determine whether the characters included in the text area CA are identifiable after compression. That is, it may be preferable that the determination of whether the characters in the text area are identifiable is made with reference to a character having a smaller size in the text area.

In step S35 of FIG. 4, the compression method specification portion 135 determines which compression level is defined as the compression-method switch level LC (see FIG. 2), based on the character size TS.

FIG. 7 is a correspondence table between a character size TS and a switch level LC. The correspondence table of FIG. 7 may be used in step S35 to determine the compression level to be applied, in an example embodiment. As depicted in FIG. 7, a range of the character size TS may be associated with each of a plurality of values (e.g., four values, such as 3, 4, 5, and 6 in this illustrative embodiment (see FIG. 2)) representing compression levels that may be candidates for the switch level LC. As depicted in FIG. 7, the correspondence may be specified such that the compression level that may be defined as the switch level LC may rise in a stepwise manner with increase of the character size.

In step S40 of FIG. 4, the compression method specification portion 135 selects a compression parameter table corresponding to the switch level LC determined in step S35 from the four compression parameter tables PT1, PT2, PT3, and PT4 depicted in FIG. 2. With the selection of the compression parameter table, seven compression methods to be associated with the seven compression levels may be specified.

In step S45 of FIG. 4, the selected level acquisition portion 120 acquires a selected level that may be a compression level selected by the user. More specifically, the UI provision portion 125 of the selected level acquisition portion 120 may display a user interface image PI including a slider interface UI1 on the display unit 260. The selected level acquisition portion 120 may acquire one selected level via the slider interface UI1.

Figure 8:
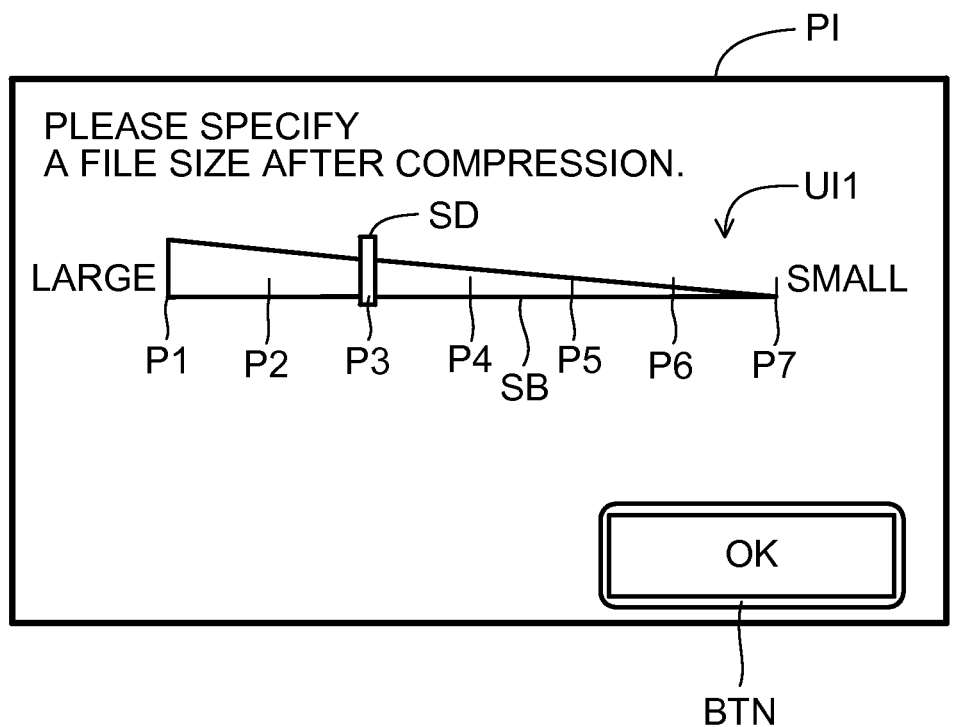
FIG. 8 illustrates an example user interface image PI in the first illustrative embodiment according to one or more aspects of the disclosure.

FIG. 8 depicts an example of the user interface image PI. The user interface image PI of FIG. 8 may be used, for example, to select a compression level by a user in association with step S45 of FIG. 4. In the example shown, the slider interface UI1 included in the user interface image PI depicted in FIG. 8 may include a slider bar SB and a slider SD that may be movable along the slider bar SB in response to a user's operation. The slider SD may be configured to move to one of seven specific positions P1 to P7 along the slider bar SB. A specific position Pn ("n" may be a natural number of 7 or smaller) may correspond to a compression level n. The user may position the slider SD at a position, corresponding to a desired compression level, of the seven specific positions P1 to P7 and then touch an "OK" button BTN to select one compression level. There may be a negative correlation between the compression ratio and the data size of compressed data. That is, as the compression level representing the compression ratio becomes higher, the data size of compressed data to be obtained may become smaller. Thus, receiving a compression level from the user may mean receiving a data size of compressed data from the user. In this illustrative embodiment, since the user interface depicted in FIG. 8 may be adopted, the user may select one compression level from the plurality of compression levels readily and instinctively by moving the slider SD to a specific position.

In step S50 (see FIG. 4), the compression portion 130 acquires one compression parameter set (see FIG. 2) corresponding to the selected level with reference to the compression parameter table selected in step S40.

In step S55 of FIG. 4, the compression portion 130 determines whether the compression method specified by the compression parameter set acquired in step S50, that is, the compression method to be used for compression of the original image data, is high compression method. When the compression method to be used is not high compression method (e.g., NO in step S55), the compression portion 130 may compress the original image data (e.g., the scan data) by the JPEG compression process to generate compressed data (e.g., step S58). The quantization table to be used in the JPEG compression process may be specified by the compression parameter set acquired in step S50. The processing for compressing the original image data in step S58 may be an example of third-type processing. After the compressed data is generated, the routine may proceed to step S75.

When the compression method is high compression method (e.g., YES in step S55), the segmentation portion 137 of the compression portion 130 generates text image data representing a text image based on the original image data (e.g., step S60 of FIG. 4). More specifically, binary data may be generated as the text image data. Of the plurality of pixels included in the original image data, in the binary data, the pixel value of each of the character-constituting pixels (see FIG. 6B) may be assigned "1" and the pixel value of each of the other pixels than the character-constituting pixel may be assigned "0".

Figure 5C:
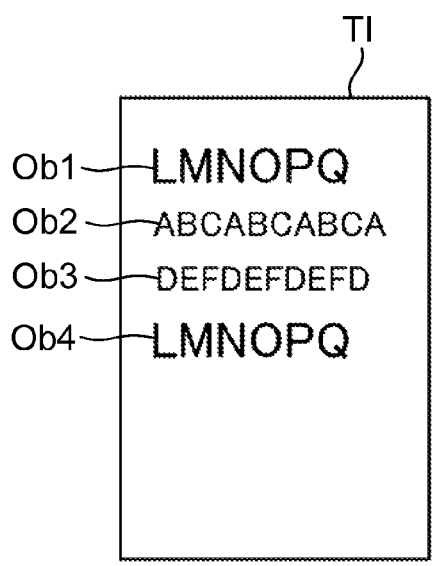
FIG. 5C illustrates an example text image TI represented by text image data in the first illustrative embodiment according to one or more aspects of the disclosure.

FIG. 5C illustrates an example of a text image TI represented by the text image data. The text image TI may include the character objects Ob1, Ob2, Ob3, and Ob4 included in the original image SI (see FIG. 5A) but not include any objects other than the character objects, that is, the ground Bg1 and the photograph object Ob5.

In step S65 of FIG. 4, the segmentation portion 137 generates background image data representing the background image based on the original image data. More specifically, the background image data may be generated by which the color value of each character-constituting pixel of the plurality of pixels included in the original image data may be changed to the color value (more specifically, the background color value BC (Rb, Gb, Bb) in FIG. 6A) of the pixel representing the background of the character-constituting pixels. As depicted in FIG. 6A, the most-frequent value in the mountain-shaped portion corresponding to the background in the R-color component histogram may be used for an R-component value Rb of the background color value BC. A G-component value Gb of the background color value BC and a B-component value Bb of the background color value BC may be calculated in a similar manner to the case of the R-component value Rb.

Figure 5D:
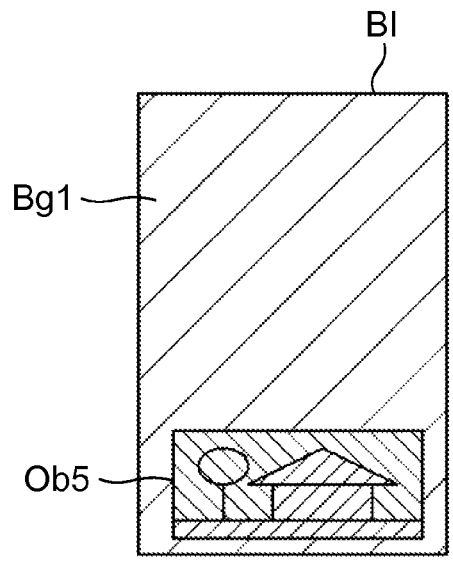
FIG. 5D illustrates an example background image BI represented by background image data in the first illustrative embodiment according to one or more aspects of the disclosure.

FIG. 5D illustrates an example of a background image BI represented by the background image data. In the example shown, the background image BI may include an object other than the character object, that is, the ground Bg1 and the photograph object Ob5 but not include the character objects Ob1-Ob4 included in the original image SI (see FIG. 5A). The background image data may also be RGB image data having the same number of tones as the original image data.

In step S70 of FIG. 4, the compression portion 130 compresses the text image data and the background image data independently to generate two pieces of compressed data. More specifically, the compression portion 130 may compress the text image data using the MMR method to generate compressed text image data. When the text image data is compressed, processing for reducing the resolution of the text image data might not be performed and thus the resolution of the original image data may be maintained. The compression portion 130 may compress the background image data using the JPEG method to generate compressed background image data. When the background image data is compressed, processing for reducing the resolution of the background image data may be performed on the background image data in a case where the resolution specified by the compression parameter set is lower than the resolution of the original image data. The quantization table to be used in the JPEG compression process for compressing the background image data may also be specified by the compression parameter set acquired in step S50. The processing for compressing the text image data in step S70 may be an example of first-type processing, and the processing for compressing the background image data in step S70 may be an example of second-type processing.

In step S75 of FIG. 4, the file generation portion 140 generates a PDF file based on the one or more pieces of compressed data. More specifically, when the adopted compression method is normal compression method, the file generation portion 140 may generate a normal PDF file that may store the one piece of compressed data generated in step S55. When the adopted compression method is high compression method, the file generation portion 140 may generate a high compression PDF file that may store the two pieces of compressed data (e.g., the compressed text image data and the compressed background image data) generated in step S70. In the high compression PDF file, the compressed background image data may be stored as image data representing a background layer and the compressed text image data may be stored as image data representing a foreground layer with being associated with the character color value TC.

According to the above-described first illustrative embodiment, for example, when original image data is first original image data representing an original image including a 20-point character and a selected level is compression level 4, the compression level 5 may be defined as the switch level LC (see FIG. 7) and the compression parameter table PT3 may be selected (see FIG. 2). Therefore, the compression portion 130 may compress the first original image data using the normal compression method. For example, when original image data is second original image data representing an original image including a 10-point character and a selected level is compression level 4, the compression level 4 may be defined as the switch level LC (see FIG. 7) and the compression parameter table PT2 may be selected (see FIG. 2). Therefore, the compression portion 130 may compress the second original image data using the high compression method. As described above, when original image data is first original image representing an original image including a character having a first size and a selected level is a specific level, the compression portion 130 may compress the first original image data using the first-type compression method. When original image data is second original image data representing an original image including a character having a second size smaller than the first size and a selected level is the same specific level as the case in which the original image data is the first original image, the compression portion 130 may compress the second original image data using the second-type compression method that may differ from the first-type compression method. That is, even when the selected level is the same specific level in both cases, original image data representing an original image including a character having a relatively larger size and original image data representing an original image including a character having a relatively smaller size may be compressed using the different compression methods, respectively. As a result, each original image data may be compressed using an appropriate one of the compression methods in accordance with the user's selected level and the character size of the character included in the original image, thereby ensuring adequate image quality for the compressed image data.

More specifically, the first original image data including the character having the relatively larger size may be compressed without being segmented into the text image data and the background image data (e.g., the normal compression method). The second original image data including the character having the relatively smaller size may be segmented into the text image data that may be binary data and the background image data that may be multi-tone data. Then, the text image data may be compressed by the MMR method that may be the lossless compression method suitable for the compression of the binary data. The background image data may be compressed by the JPEG method that may be the lossy compression method suitable for the compression of the multi-tone data. Thus, the compression ratio corresponding to the selected level may be obtained while legibility of the characters may be ensured.

More specifically, in this illustrative embodiment, either of the high compression method and the normal compression method may be available, and each of the high compression method and the normal compression method may include a plurality of types of compression methods, wherein the compression ratios to be obtained as a result of the respective compression methods may differ from each other and change in a stepwise manner due to the difference in value of the plurality of compression parameter sets. Further, a compression ratio to be obtained as a result of compression using a compression method for achieving a relatively lower compression ratio among the plurality of types of compression methods of the high compression method may be substantially the same as a compression ratio to be obtained as a result of compression using a compression method for achieving a relatively higher compression ratio among the plurality of types of compression methods of the normal compression method. Further, from the viewpoint of the image quality, in the normal compression method including the JPEG compression process, a surrounding area including multiple tones may appear in a boundary portion between a character and a background, and the surrounding area may become larger in area as the degree of compression ratio is higher. The surrounding area may affect the character with a natural appearance when the character size is relatively large. Nevertheless, when the character size is relatively small, the surrounding area may cause the character to blur, thereby decreasing the legibility of the character. In the high compression method, the character may be represented by binary data. Therefore, although the tone gradation of the boundary portion between the character and the background is lost, the resolution of the original image data may be maintained in the binary data and the binary data may be compressed by the lossless compression process. Thus, the boundary portion between the character and the background may be made sharp. As a consequence, in the high compression method, the legibility of the character may be maintained regardless of the compression ratio. That is, it may be considered that a compression method, which may provide appropriate image quality to compressed image data, of the normal compression method and the high compression method both for achieving substantially the same compression ratio may depend on a size of a character included in an original image. If, however, the user is required to select an appropriate compression method from the available compression methods in consideration of a desired image quality and a desired compression ratio, such a selection may be too heavy a burden for the user. According to this illustrative embodiment, the user may readily acquire the compressed image data that may be compressed at a desired compression degree and have an appropriate image quality by selecting one compression level from the multiple compression levels representing the respective compression degrees (e.g., the compression ratios).

According to this illustrative embodiment, when the original image data is the first original image data representing the original image including the 20-point character and the selected level is compression level 4, the compression portion 130 may compress the first original image data using the normal compression method. When the original image data is the first original image data and the selected level is compression level 5 representing a compression ratio that is higher than a compression ratio represented by the compression level 4, the compression portion 130 may compress the first original image data using the high compression method. That is, when the different levels are selected by the user for the compression of the same first original image, the different compression methods may be used in the respective cases. As described above, each original image data may be compressed using an appropriate one of the compression methods in accordance with the selected level, thereby ensuring adequate image quality for the compressed image data.

As described above with reference to FIGS. 2, 3A, and 3B, the size of first compressed data obtained by the compression of the first original image data using the normal compression method when the selected level is a compression level (LC-1) that is one level lower than the switch level LC, may be larger than the size of second compressed data (e.g., the total data size of the compressed text image data and the compressed background image data) obtained by the compression of the first original image data using the high compression method when the selected level is the compression level LC (e.g., the switch level LC). Thus, as the compression level becomes higher, the size of the compressed data may become smaller even when the compression method to be adopted may be switched to another method at the switch level LC. Therefore, the compressed data having the appropriate size may be generated in accordance with the selected level.

According to the above-described example configuration, the compression method specification portion 135 may change the switch level LC to an appropriate compression level in accordance with the original image data without changing the number of selectable compression levels. For example, when original image data represents an original image including a 20-point character, the compression method specification portion 135 may assign the normal compression method to four levels and the high compression method to the other three levels of the seven selectable levels. When original image data represents an original image including a 10-point character, the compression method specification portion 135 may assign the normal compression method to three levels and the high compression method to the other four levels of the seven selectable levels. Thus, the original image data may be compressed by the compression method specified appropriately in accordance with the user-selected level and the original image data. As a consequence, while the number of compression levels that can be selected by the user may be maintained to a constant value, the number of compression levels corresponding to the first-type compression method and the number of compression levels corresponding to the second-type compression level may be changed appropriately in accordance with the original image data. Thus, the image data compressed to achieve a compression ratio specified by the selected level may have appropriate image quality.

In example embodiments, the compression method specification portion 135 may analyze the original image data to determine the character size of the character included in the original image, and may specify the plurality of compression methods corresponding to the plurality of levels in accordance with the character size of the character included in the original image (see. FIGS. 2, 6A, 6B, and 7). As a result, appropriate compression methods may be assigned to compression levels, respectively, in accordance with the character size of the character included in the original image.

B. Second Illustrative Embodiment

In the image processing (see FIG. 4) according to the first illustrative embodiment, the character size may be determined through the analysis of the original image data and the switch level LC of the compression method may be determined in accordance with the character size (see steps S20 to S35 in FIG. 4). In image processing according to a second illustrative embodiment, instead of this, the switch level LC of the compression method may be determined using a character recognition process.

FIG. 9 is a flowchart of the image processing according to the second illustrative embodiment. In steps S100 and S105, processing that may be the same as the processing of steps S10 and S15 in FIG. 4 are performed to acquire original image data (e.g., scan data). In step S110, the compression method specification portion 135 compresses the original image data by four normal compression methods corresponding to the compression levels 1, 3, 4, and 5, respectively, specified in the compression parameter table PT4, to generate four pieces of compressed data. In the JPEG compression process included in each of the four normal compression methods, different quantization tables may be used respectively.

In step S115, the compression method specification portion 135 performs the character recognition process on each of the four pieces of compressed data. More specifically, the compression method specification portion 135 may decompress processing-target compressed data to generate decompressed image data. The compression method specification portion 135 may perform the recognition process using a character recognition algorithm of a known OCR process on the decompressed image data so as to recognize a plurality of characters included in the image represented by the decompressed image data. The normal compression method including the JPEG compression process may be a lossy compression method. Therefore, the image quality of the image represented by the decompressed image data may be degraded as compared with the image quality of the image represented by the original image data. More specifically, it may be conceivable that characters may be blurred in an image represented by the decompressed image data corresponding to the image data compressed by the normal compression method associated with a higher compression level. Therefore, it may be considered that accuracy of the character recognition is lower in the result of the character recognition process performed on the compressed data acquired through the compression of the original image data by the normal compression method associated with a higher compression level. Hereinafter, the result of the character recognition process performed on the compressed data acquired through the compression of the original image data by the normal compression method associated with a specific compression level may be simply referred to as "character recognition result of the specific compression level".

The character recognition result may include, for example, a character code (e.g., ASCII code) that may represent a character recognized in the processing-target image and a coordinate that may represent a location of the recognized character in the image.

In step S120, the compression method specification portion 135 sets a reference level and an evaluation-target level to their initial settings, respectively. The reference level may be set to compression level 1 representing the lowest compression ratio, that is, the compression level for achieving the highest image quality. The evaluation-target level may be set to compression level 3 representing the lowest compression ratio among the compression levels that may be candidates for the switch level LC.

In step S125, the compression method specification portion 135 calculates a difference DV between the character recognition result of the reference level and the character recognition result of the evaluation-target level. More specifically, the compression method specification portion 135 may determine whether a character of the plurality of characters recognized as the result of the character recognition of the reference level (also referred to as a "reference character") represents the same character as a character recognized at the same location in the image as the location of the reference character, as the result of the character recognition of the evaluation-target level (also, referred to as a "corresponding character"). This determination is performed on each of the plurality of characters on reference-character basis. When the reference character and its corresponding character represent different characters, respectively, the compression method specification portion 135 may increment the count of the difference DV. As described above, the difference DV may be calculated.

In step S130, the compression method specification portion 135 determines whether the difference DV is greater than a predetermined threshold value TH. When the difference DV is smaller than or equal to the predetermined threshold value TH (e.g., NO in step S130), the compression method specification portion 135 may determine whether the current evaluation-target level indicates compression level 5 representing the highest compression level of the compression levels that may be candidates for the evaluation-target level (e.g., step S135). When the current evaluation-target level does not indicate compression level 5 (e.g., NO in step S135), the compression method specification portion 135 may change the evaluation-target level to another compression level that may be higher than the current evaluation-target level by one level (e.g., step S140), and the routine may return to step S125. When the current evaluation-target level indicates compression level 5 (e.g., YES in step S135) or when the difference DV is greater than the predetermined threshold value TH (e.g., YES in step S130), the compression method specification portion 135 proceed to step S145. In step S145, the compression method specification portion 135 may define the current evaluation-target level as the switch level LC of the compression method.

In step S150, the same processing as the processing from steps S40 to S75 in FIG. 4 are performed. Thus, similar to the image processing according to the first illustrative embodiment, a PDF file that may store compressed data based on the original image data may be generated.

According to the second illustrative embodiment, the compression method specification portion 135 may repeat the calculation of the difference DV and the comparison of the difference DV and the threshold value TH until the difference DV becomes greater than the predetermined threshold value TH, by raising the evaluation-target level of up to the compression level 5 by one level. Then, the compression method specification portion 135 may determine, as the switch level LC, the evaluation-target level that has been specified at that point in time when the difference DV becomes greater than the predetermined threshold value TH or when the evaluation-target level becomes compression level 5 in spite of the fact that the difference DV is lower than or equal to the predetermined threshold value TH. The difference DV may be an evaluation value that represents a frequency of an occurrence of character misrecognition in the target image in the character recognition process. There may be a case where characters are represented unclearly in the target image due to blurring of the characters and/or the character size in the target image. In such a case, it may be conceivable that the difference DV becomes greater. In other words, the difference DV may be an evaluation value for evaluating the legibility of the characters in the target image. Accordingly, it may be considered that, in the above-described processing, the compression method specification portion 135 may evaluate character illegibility when the target image is compressed by the normal compression method, by raising the evaluation-target compression level by one level, and determine the switch level LC such that the high compression method may be assigned to the compression methods corresponding to the compression level higher than or equal to the compression level at which the character illegibility becomes worse than the reference. According to the above-described configuration, the switch level LC may be appropriately determined using the character recognition process. Thus, appropriate compression methods may be assigned to compression levels, respectively. Consequently, the advantages obtained in the image processing according to the first illustrative embodiment may also be obtained in the image processing according to the second illustrative embodiment.

Generally, the degree of blurring of the character in the scan data may depend on the performance of the scanner 300. Therefore, it may be conceivable that the degree of blurring of the character in a plurality of pieces of original image data may become substantially the same when the plurality of pieces of original image data are generated using the same scanner 300. Thus, it may be considered that the difference of the character illegibility among the plurality of pieces of original image data generated using the same scanner 300 depends on the character size mainly. Accordingly, in the second illustrative embodiment, also, similar to the first illustrative embodiment, as a result, the switch level LC may be determined such that a higher compression level may be defined as the switch level LC in accordance with the increase of the character size. Therefore, in the second illustrative embodiment, consequently, similar to the first illustrative embodiment, when the original image data is the first original image data representing the original image including the character having the first size and the selected level is the specific level, the compression portion 130 may compress the first original image data using the normal compression method. When the original image data is the second original image data representing the original image including the character having the second size smaller than the first size and the selected level is the same specific level, the compression portion 130 may compress the second original image data using the high compression method.

C. Variations (1) In the first illustrative embodiment, the total number of compression levels (e.g., seven levels) that may be selectable by the user may be merely an example, and the number of compression levels (e.g., four levels, such as compression levels 3, 4, 5, and 6) that may be the candidates for the switch level LC, of the total number of compression levels may also be merely an example. Generally speaking, the value of the total number of compression levels may be set to any integer M that may be 3 or greater, and the value of the switch level LC may be set to any integer that may be 2 or greater and be M or less. It may be preferable that the greater number of compression levels may be assigned the normal compression method and the less number of compression levels may be assigned the high compression method as the character size of the character included in the original image data is larger. In other words, it may be preferable that, when the original image data is the first original image data representing the original image including the character having the first size, the compression method specification portion 135 may assign the normal compression method to "a1"-number level(s) of a plurality of levels and the high compression method to "a2"-number level(s) of the plurality of levels. When the original image data is the second original image data representing the original image including the character having the second size that may be smaller than the first size, the compression method specification portion 135 may assign the normal compression method to "b1"-number level(s) of the plurality of levels and the high compression method to "b2"-number level(s) of the plurality of levels. A relationship among "a1", "a2", "b1", and "b2" may preferably satisfy b1<a1, b2>a2, and a1+a2=b1+b2 (=M) (where "a1", "a2", "b1", and "b2" may be an integer of 1 or greater). When a condition where b1<a1 and b2>a2 is satisfied, a1≥2 and b2≥2. Thus, an expression M=a1+a2=b1+b2≥3 may be satisfied.

(2) In the second illustrative embodiment, the compressed data obtained by the compression of the original image data by the normal compression method corresponding to the compression level 1 may be used as the reference image data for comparing the results of the character recognition process. Instead of this, the reference image data may be original image data or compressed data obtained by the compression of the original image data by the normal compression method corresponding to the compression level 2. Generally speaking, the compression method specification portion 135 may (a) recognize a plurality of characters included in a reference image represented by reference image data by performing the character recognition process on the reference image data that may be one of original image data and image data acquired based on the original image data, (b) generate compressed data by compressing the original image data using the normal compression method in which the compression parameter set associated with one of the plurality of compression levels may be used, (c) recognize a plurality of characters included in the compressed image represented by the compressed data by performing the character recognition process on the compressed data, and (d) specify the plurality of compression methods corresponding to the plurality of levels, respectively, based on the recognition result of the plurality of characters included in the reference image and the recognition result of the plurality of characters included in the compressed image.

The comparison between the compressed data acquired by the compression of the original image data using the normal compression method corresponding to the evaluation-target level and the reference image data may be performed using another method, instead of using the character recognition process. For example, the compression method specification portion 135 may calculate a difference $\Delta V2$ in pixel value between a plurality of pixels representing some or all of the characters and representing surrounding areas of the characters included in the image represented by the evaluation-target compressed image data, and a plurality of corresponding pixels in a reference image represented by reference image data. Then, the calculated difference $\Delta V2$ may be adopted for the evaluation value indicating the degree of character illegibility, instead of the difference $\Delta V$ according to the second illustrative embodiment.

(3) The normal compression method as the first-type compression method and the high compression method as the second-type compression method according to the above-described illustrative embodiments may be merely examples. The first-type compression method may be a compression method by which the character legibility is reduced when data is compressed at a higher compression level. For example, a compression process in which some or all of attributes, such as the resolution, the tone gradation, the number of color components, the number of color candidates (e.g., bit number of color data) of the image data may be reduced in accordance with a predetermined rule, or a compression process that may be a combination of the above-described compression process and the JPEG compression process may be adopted as the first-type compression method. The second-type compression method may be a compression method by which the character legibility is less reduced than the character legibility reduction by the first-type compression method. For example, another compression method that may be different from the compression method adopted in the above illustrative embodiments may be adopted to compress the background image data. For instance, a compression method similar to the variation of the first-type compression method described above may be adopted as the compression method for compressing the background image data. For example, a compression process that a process for reducing the number of color candidates (e.g., the bit number of color data) and the lossless compression such as the Deflate compression may be combined may be adopted as the text image data compression method.

(4) The interface UI1 for receiving the selected level selected by the user depicted in FIG. 8 may be merely an example. For example, a user interface in which a numerical value of a selected level may be inputted in a predetermined input box may instead be adopted. In another case, a user interface that may include a plurality of radio buttons corresponding to the plurality of compression levels, respectively, and in which one of the plurality of radio buttons may be selected may instead be adopted.

(5) In each of the illustrative embodiments, the quantization tables A1-A5 may be used in the normal compression method and other quantization tables B1-B4 may be used in the high compression method. (see FIGS. 2 and 3). Instead of this, in other embodiments, for example, a plurality of quantization tables C1 to Ck ("k" may be a natural number that is equal to or greater than the number of compression levels) for achieving different compression ratios may be prepared, and the quantization tables C1 to Ck may be used commonly in the normal compression method and the high compression method.

(6) In each of the illustrative embodiments, the color scan data including the three component values for each pixel may be used as the original image data. Nevertheless, in other embodiments, for example, monochrome scan data including one component value for each pixel may be used as the original image data. The original image data might not be limited to the scan data, but may be image data created using an application program such as drawing application or document creation application.

(7) In each of the illustrative embodiments, the image processing function of the scanner driver 100 may be implemented by the computer 200. Instead of this, for example, the image processing function of the scanner driver 100 may be implemented by a control device equipped in a device, such as a multifunction peripheral, a digital camera, or a scanner, or a server that may be communicable with such a device via a network. For example, the scanner 300 may generate in response to a reading instruction from the computer 200 and transmit the scan data to a server. The server may perform the image processing (see FIG. 4 and FIG. 9) according to one of the illustrative embodiments using the scan data to generate a high compression PDF file and transmit the high compression PDF file to one of the scanner 300 and the computer 200. The image processing function may be implemented by a single device or by a plurality of devices that may be connected with each other via a network (e.g., a server and one of a scanner and a multifunction peripheral). In this case, a system equipped with a plurality of device that may implement the image processing function may correspond to the image processing device.

(8) Part of the configurations implemented by hardware in the above-described illustrative embodiment may be replaced with software, or conversely, part of the configurations implemented by software in the above-described illustrative embodiment may be replaced with hardware In particular, and referring to FIGS. 1-9 overall, embodiments of the present disclosure can be implemented as a computer process (method), a computing system, or as an article of manufacture, such as a computer program product or computer readable media. The computer program product may be a computer-readable storage media readable by a computer system and encoding a computer program of instructions for executing a computer process. Accordingly, embodiments of the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media. Further, the disclosed methods' stages may be modified in any manner, including by reordering stages and/or inserting or deleting stages, without departing from the overall concept of the present disclosure.

Although the disclosure has been described based on illustrative embodiments and variations, the illustrative embodiments of the disclosure facilitate the understanding of the disclosure and do not limit the disclosure. The disclosure may be changed or modified without departing from the spirit of the invention and the scope of the claims and includes the equivalents thereof.

What is claimed is:

1. An image processing device comprising:
a processor configured to:
acquire original image data representing an original image;
acquire a level selected from a plurality of levels that represent compression degrees; and
compress the original image data according to the original image data and the selected level so as to generate compressed image data,
wherein, to compress the original image data, the processor is configured to:
compress first original image data using a first-type compression method when the original image data is the first original image data representing an original image including a character having a first size and when the selected level is a specific level of the plurality of levels; and
compress second original image data using a second-type compression method that is different from the first-type compression method when the original image data is the second original image data representing an original image including a character having a second size that is smaller than the first size and when the selected level is the specific level;
wherein the processor is further configured to:
specify a plurality of compression methods corresponding to the plurality of levels,
wherein when the original image data is the first original image data, the first-type compression method is assigned to a1 number of levels of the plurality of levels and the second-type compression method is assigned to a2 number of level(s) of the plurality of levels,
wherein when the original image data is the second original image data, the first-type compression method is assigned to b1 number of level(s) of the plurality of levels and the second-type compression method is assigned to b2 number of levels of the plurality of levels, and
wherein a1, a2, b1, and b2 satisfy b1<a1, b2>a2, and a1+a2=b1+b2; and
wherein the processor is further configured to:
analyze the original image data so as to determine a size of a character in the original image; and
specify the plurality of compression methods corresponding to the plurality of levels, based on the size of the character.

2. The image processing device according to claim 1, wherein, to compress the original image data, the processor is further configured to:

compress the first original image data using the first-type compression method when the original image data is the first original image data and the selected level is a first level; and compress the first original image data using the second-type compression method when the original image data is the first original image data and the selected level is a second level that represents a higher compression degree than the first level.

3. The image processing device according to claim 2, wherein the second level represents a higher compression degree than the first level by one level, and a size of first compressed data obtained by compressing the first original image data using the first-type compression method when the selected level is the first level is larger than a size of second compressed data obtained by compressing the first original image data using the second-type compression method when the selected level is the second level.

4. The image processing device according to claim 1, wherein the processor is further configured to:

provide a user interface image to a display unit, wherein the user interface includes a slider bar and a slider that is movable along the slider bar in response to a user's operation, and a plurality of specific positions of the slider along the slider bar correspond to the plurality of levels; and acquire the selected level via the user interface.

5. The image processing device according to claim 1, wherein the processor is further configured to:

segment the original image data into text image data representing a text image and background image data representing a background image not including text included in the original image, wherein the second-type compression method includes a first-type processing for compressing the text image data and a second-type processing for compressing the background image data by a different method from the first-type processing, and wherein the first-type compression method includes a third-type processing for compressing the original data without segmenting the original image data into text image data and the background image data.

6. The image processing device according to claim 5, wherein when the first-type compression method is assigned to a third level and a fourth level of the plurality of levels and the fourth level represents a higher compression degree than the third level, the first-type compression method corresponding to the third level comprises the third-type processing for performing a JPEG compression process using a first quantization table on image data with a first resolution obtained from the original image data, the first-type compression method corresponding to the fourth level comprises the third-type processing for performing a JPEG compression process using a second quantization table on image data with the first resolution obtained from the original image data, and the second quantization table can provide a higher compression ratio than a compression ratio provided by the first quantization table.

7. The image processing device according to claim 5, wherein when the second-type compression method is assigned to a fifth level and a sixth level of the plurality of levels and the sixth level represents a higher compression degree than the fifth level, the second-type compression method corresponding to the fifth level comprises the first-type processing for compressing the text image data with a second resolution and the second-type processing for compressing the background image data with a third resolution, and the second-type compression method corresponding to the sixth level comprises the first-type processing for compressing the text image data with the second resolution and the second-type processing for compressing the background image data with a fourth resolution that is lower than the third resolution.

8. The image processing device according to claim 5, wherein when the second-type compression method is assigned to a seventh level and a eighth level of the plurality of levels and the eighth level represents a higher compression degree than the seventh level, the second-type compression method corresponding to the seventh level comprises the first-type processing for compressing the text image data with a fourth resolution and the second-type processing for performing a JPEG compression process using a third quantization table on the background image data, the second-type compression method corresponding to the eighth level comprises the first-type processing for compressing the text image data with the fourth resolution and the second-type processing for performing a JPEG compression process using a fourth quantization table on the background image data, and the fourth quantization table can provide a higher compression ratio than a compression ratio provided by the third quantization table.

9. A non-transitory computer-readable storage medium storing computer-readable instructions that, when executed, cause a processor to perform a method comprising:

acquiring original image data representing an original image;

acquiring a level selected from a plurality of levels that represent compression degrees; and compressing the original image data according to the original image data and the selected level so as to generate compressed image data, wherein the compressing of the original image data further comprises:

compressing first original image data using a first-type compression method when the original image data is the first original image data representing an original image including a character having a first size and when the selected level is a specific level of the plurality of levels; and compressing second original image data using a second-type compression method that is different from the first-type compression method when the original image data is the second original image data representing an original image including a character having a second size that is smaller than the first size and when the selected level is the specific level;

wherein the method further includes:

specifying a plurality of compression methods corresponding to the plurality of levels, wherein when the original image data is the first original image data, the first-type compression method is assigned to a1 number of levels of the plurality of levels and the second-type compression method is assigned to a2 number of level(s) of the plurality of levels, wherein when the original image data is the second original image data, the first-type compression method is assigned to b1 number of level(s) of the plurality of levels and the second-type compression method is assigned to b2 number of levels of the plurality of levels, and wherein a1, a2, b1, and b2 satisfy b1<a1, b2>a2, and a1+a2=b1+b2; and wherein the method further includes:

analyzing the original image data so as to determine a size of a character in the original image; and specifying the plurality of compression methods corresponding to the plurality of levels, based on the size of the character.

10. The computer-readable storage medium according to claim 9, wherein the compressing of the original image data further comprises:

compressing the first original image data using the first-type compression method when the original image data is the first original image data and the selected level is a first level; and compressing the first original image data using the second-type compression method when the original image data is the first original image data and the selected level is a second level that represents a higher compression degree than the first level.

11. The computer-readable storage medium according to claim 10, wherein the second level represents a higher compression degree than the first level by one level, and a size of first compressed data obtained by compressing the first original image data using the first-type compression method when the selected level is the first level is larger than a size of second compressed data obtained by compressing the first original image data using the second-type compression method when the selected level is the second level.

12. The computer-readable storage medium according to claim 9, wherein the method further includes:

providing a user interface image to a display unit, wherein the user interface includes a slider bar and a slider that is movable along the slider bar in response to a user's operation, and a plurality of specific positions of the slider along the slider bar correspond to the plurality of levels; and acquiring the selected level via the user interface.

13. The computer-readable storage medium according to claim 9, wherein the method further includes:

segmenting the original image data into text image data representing a text image and background image data representing a background image not including text included in the original image, wherein the second-type compression method includes a first-type processing for compressing the text image data and a second-type processing for compressing the background image data by a different method from the first-type processing, and wherein the first-type compression method includes a third-type processing for compressing the original data without segmenting the original image data into text image data and the background image data.

14. The computer-readable storage medium according to claim 13, wherein when the first-type compression method is assigned to a third level and a fourth level of the plurality of levels and the fourth level represents a higher compression degree than the third level, the first-type compression method corresponding to the third level comprises the third-type processing for performing a JPEG compression process using a first quantization table on image data with a first resolution obtained from the original image data, the first-type compression method corresponding to the fourth level comprises the third-type processing for performing a JPEG compression process using a second quantization table on image data with the first resolution obtained from the original image data, and the second quantization table can provide a higher compression ratio than a compression ratio provided by the first quantization table.

15. The computer-readable storage medium according to claim 13, wherein when the second-type compression method is assigned to a fifth level and a sixth level of the plurality of levels and the sixth level represents a higher compression degree than the fifth level, the second-type compression method corresponding to the fifth level comprises the first-type processing for compressing the text image data with a second resolution and the second-type processing for compressing the background image data with a third resolution, and the second-type compression method corresponding to the sixth level comprises the first-type processing for compressing the text image data with the second resolution and the second-type processing for compressing the background image data with a fourth resolution that is lower than the third resolution.

16. The computer-readable storage medium according to claim 13, wherein when the second-type compression method is assigned to a seventh level and a eighth level of the plurality of levels and the eighth level represents a higher compression degree than the seventh level, the second-type compression method corresponding to the seventh level comprises the first-type processing for compressing the text image data with a fourth resolution and the second-type processing for performing a JPEG compression process using a third quantization table on the background image data, the second-type compression method corresponding to the eighth level comprises the first-type processing for compressing the text image data with the fourth resolution and the second-type processing for performing a JPEG compression process using a fourth quantization table on the background image data, and the fourth quantization table can provide a higher compression ratio than a compression ratio provided by the third quantization table.

17. A method comprising:

acquiring original image data representing an original image;

acquiring a level selected from a plurality of levels that represent compression degrees; and compressing first original image data using a first-type compression method if the original image data is the first original image data representing an original image including a character having a first size, and the selected level is a specific level of the plurality of levels; and compressing second original image data using a second-type compression method that is different from the first-type compression method if the original image data representing an original image including a character having a second size that is smaller than the first size is the second original image data different from the first original image data, and the selected level is the specific level;

wherein the method further includes:

specifying a plurality of compression methods corresponding to the plurality of levels, wherein when the original image data is the first original image data, the first-type compression method is assigned to a1 number of levels of the plurality of levels and the second-type compression method is assigned to a2 number of level(s) of the plurality of levels, wherein when the original image data is the second original image data, the first-type compression method is assigned to b1 number of level(s) of the plurality of levels and the second-type compression method is assigned to b2 number of levels of the plurality of levels, and wherein a1, a2, b1, and b2 satisfy b1<a1, b2>a2, and a1+a2=b1+b2; and wherein the method further includes:

analyzing the original image data so as to determine a size of a character in the original image; and specifying the plurality of compression methods corresponding to the plurality of levels, based on the size of the character.

18. An image processing device comprising:
a processor configured to:
acquire original image data representing an original image;
acquire a level selected from a plurality of levels that represent compression degrees; and
compress the original image data according to the original image data and the selected level so as to generate compressed image data,
wherein, to compress the original image data, the processor is configured to:
compress first original image data using a first-type compression method when the original image data is the first original image data representing an original image including a character having a first size and when the selected level is a specific level of the plurality of levels; and
compress second original image data using a second-type compression method that is different from the first-type compression method when the original image data is the second original image data representing an original image including a character having a second size that is smaller than the first size and when the selected level is the specific level;
wherein the processor is further configured to:
specify a plurality of compression methods corresponding to the plurality of levels,
wherein when the original image data is the first original image data, the first-type compression method is assigned to a1 number of levels of the plurality of levels and the second-type compression method is assigned to a2 number of level(s) of the plurality of levels,
wherein when the original image data is the second original image data, the first-type compression method is assigned to b1 number of level(s) of the plurality of levels and the second-type compression method is assigned to b2 number of levels of the plurality of levels, and
wherein a1, a2, b1, and b2 satisfy b1<a1, b2>a2, and a1+a2=b1+b2; and
wherein the processor is further configured to:
execute a character recognition process on reference image data so as to recognize a plurality of characters included in a reference image represented by the reference image data, the reference image data being one of the original image data and image data obtained based on the original image data;
compress the original image data using the first-type compression method in which a compression parameter set associated with one of the plurality of compression levels is used, so as to generate compressed data;
execute the character recognition process on the compressed data so as to recognize a plurality of characters included in a compressed image represented by the compressed data; and
specify the plurality of compression methods corresponding to the plurality of levels, based on the recognition result of the plurality of characters included in the reference image and the recognition result of the plurality of characters included in the compressed image.

19. The image processing device according to claim 18, wherein, to compress the original image data, the processor is further configured to:
compress the first original image data using the first-type compression method when the original image data is the first original image data and the selected level is a first level; and
compress the first original image data using the second-type compression method when the original image data is the first original image data and the selected level is a second level that represents a higher compression degree than the first level.

20. The image processing device according to claim 19, wherein the second level represents a higher compression degree than the first level by one level, and
a size of first compressed data obtained by compressing the first original image data using the first-type compression method when the selected level is the first level is larger than a size of second compressed data obtained by compressing the first original image data using the second-type compression method when the selected level is the second level.

21. The image processing device according to claim 18, wherein the processor is further configured to:
provide a user interface image to a display unit, wherein the user interface includes a slider bar and a slider that is movable along the slider bar in response to a user's operation, and a plurality of specific positions of the slider along the slider bar correspond to the plurality of levels; and
acquire the selected level via the user interface.

22. The image processing device according to claim 18, wherein the processor is further configured to:
segment the original image data into text image data representing a text image and background image data representing a background image not including text included in the original image,
wherein the second-type compression method includes a first-type processing for compressing the text image data and a second-type processing for compressing the background image data by a different method from the first-type processing, and
wherein the first-type compression method includes a third-type processing for compressing the original data without segmenting the original image data into text image data and the background image data.

23. A non-transitory computer-readable storage medium storing computer-readable instructions that, when executed, cause a processor to perform a method comprising:
acquiring original image data representing an original image;
acquiring a level selected from a plurality of levels that represent compression degrees; and
compressing the original image data according to the original image data and the selected level so as to generate compressed image data,
wherein the compressing of the original image data further comprises:

compressing first original image data using a first-type compression method when the original image data is the first original image data representing an original image including a character having a first size and when the selected level is a specific level of the plurality of levels; and compressing second original image data using a second-type compression method that is different from the first-type compression method when the original image data is the second original image data representing an original image including a character having a second size that is smaller than the first size and when the selected level is the specific level;

wherein the method further includes:

specifying a plurality of compression methods corresponding to the plurality of levels, wherein when the original image data is the first original image data, the first-type compression method is assigned to a1 number of levels of the plurality of levels and the second-type compression method is assigned to a2 number of level(s) of the plurality of levels, wherein when the original image data is the second original image data, the first-type compression method is assigned to b1 number of level(s) of the plurality of levels and the second-type compression method is assigned to b2 number of levels of the plurality of levels, and wherein a1, a2, b1, and b2 satisfy b1<a1, b2>a2, and a1+a2=b1+b2; and wherein the method further includes:

executing a character recognition process on a reference image data so as to recognize a plurality of characters included in a reference image represented by reference image data, the reference image data being one of the original image data and image data obtained based on the original image data;

compressing the original image data using the first-type compression method in which a compression parameter set associated with one of the plurality of compression levels is used, so as to generate compressed data;

executing the character recognition process on the compressed data so as to recognize a plurality of characters included in a compressed image represented by the compressed data; and specifying the plurality of compression methods corresponding to the plurality of levels, based on the recognition result of the plurality of characters included in the reference image and the recognition result of the plurality of characters included in the compressed image.

24. The computer-readable storage medium according to claim 23, wherein the compressing of the original image data further comprises:

compressing the first original image data using the first-type compression method when the original image data is the first original image data and the selected level is a first level; and compressing the first original image data using the second-type compression method when the original image data is the first original image data and the selected level is a second level that represents a higher compression degree than the first level.

25. The computer-readable storage medium according to claim 24, wherein the second level represents a higher compression degree than the first level by one level, and a size of first compressed data obtained by compressing the first original image data using the first-type compression method when the selected level is the first level is larger than a size of second compressed data obtained by compressing the first original image data using the second-type compression method when the selected level is the second level.

26. The computer-readable storage medium according to claim 23, wherein the method further includes:

providing a user interface image to a display unit, wherein the user interface includes a slider bar and a slider that is movable along the slider bar in response to a user's operation, and a plurality of specific positions of the slider along the slider bar correspond to the plurality of levels; and acquiring the selected level via the user interface.

27. The computer-readable storage medium according to claim 23, wherein the method further includes:

segmenting the original image data into text image data representing a text image and background image data representing a background image not including text included in the original image, wherein the second-type compression method includes a first-type processing for compressing the text image data and a second-type processing for compressing the background image data by a different method from the first-type processing, and wherein the first-type compression method includes a third-type processing for compressing the original data without segmenting the original image data into text image data and the background image data.

* * * * *